United States Patent Office 2,845,081
Patented July 29, 1958

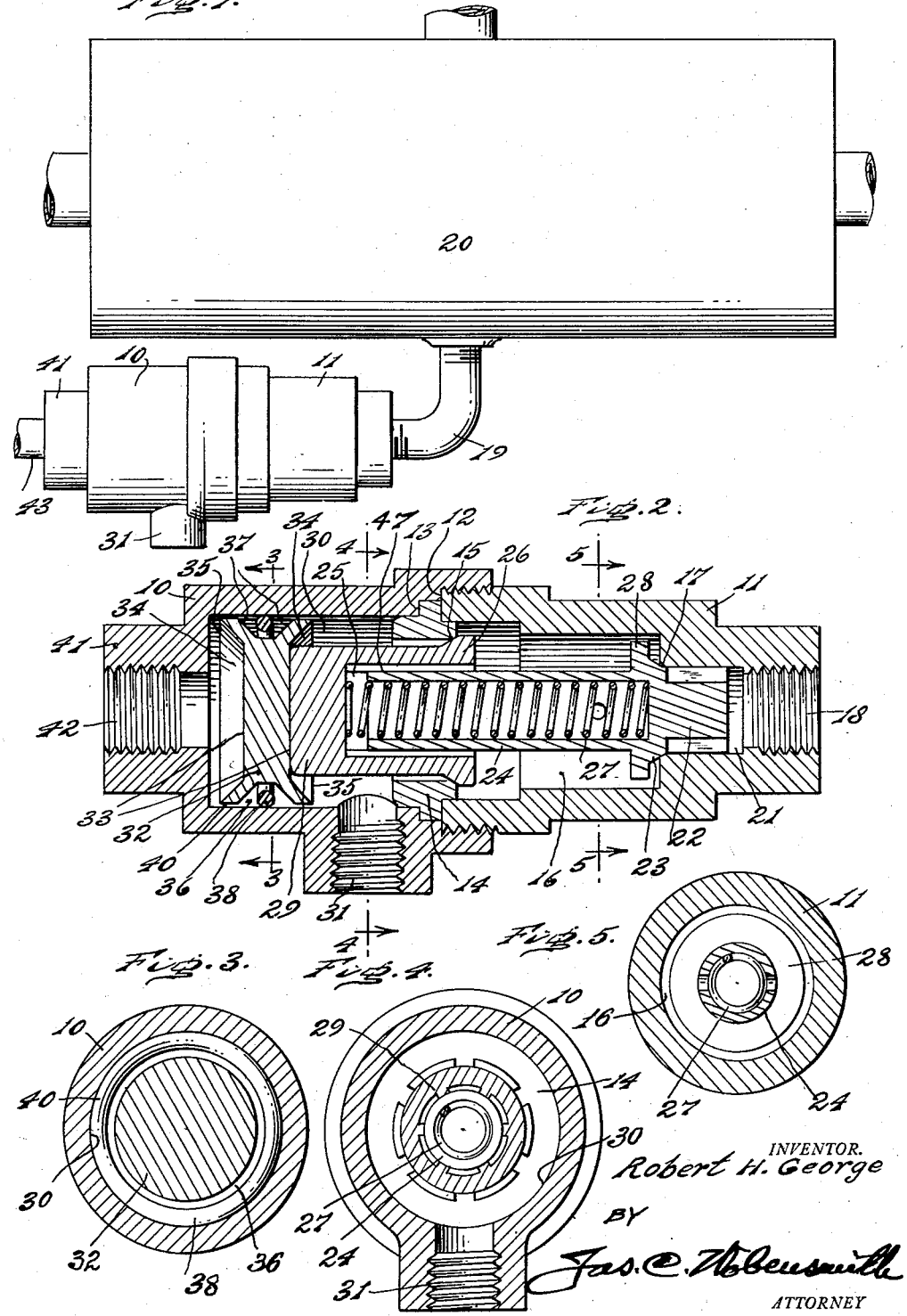

2,845,081

DRAIN VALVES

Robert H. George, Melrose Park, Pa.

Application June 9, 1954, Serial No. 435,405

3 Claims. (Cl. 137—204)

This invention relates to drain valves and it relates more particularly to an automatic drain valve which is adapted for the removal of condensate from the air reservoirs and other parts of compressed air apparatus.

The drain valve of the present invention is of the general type in which momentary impulses of air under pressure are utilized for actuating the drain valve from time to time thereby to permit the discharge of condensate which may have accumulated and which should be drained from the place of its accumulation. The desired actuating impulses are ordinarily supplied by connections to suitable parts of the control mechanism.

Heretofore in the use of automatic valves of the type mentioned, it frequently occurs that operating portions of the valve mechanism become locked or stopped as, for example, by the lodging of pieces of scale or other foreign material on one of the valve seats, or in the event of freezing the condensate in the operating cylinder, the valve would sometimes remain open and permit all of the air to escape from the receiver or other parts of the compressed air apparatus in connection with which the drain valve was used.

By reason of the foregoing, many operators of motor trucks, in which the brakes are operated by compressed air, will not permit the use of automatic drain valves in connection with such compressed air apparatus, as the consequences of a failure of a proper supply of compressed air for brake operation are well known.

The principal object of the present invention is to provide an automatic drain valve for removing condensate from compressed air apparatus which is so constructed and arranged whereby the effect and result of holding a valve member in the open or drainage position will be effectively obviated.

A further object of the invention is to provide an automatic drain valve of the character aforesaid, with improved means whereby any condensate which may accumulate behind the piston and in the operating cylinder will be automatically removed.

A further object of the invention is to provide a drain valve of the character aforesaid, with certain improvements in the details of construction whereby the valve will operate more efficiently.

A further object of the invention is to provide an automatic drain valve of the character aforesaid, which is so constructed and arranged as to permit the same to be economically made and assembled.

A further object of the invention is to provide an automatic drain valve of the character aforesaid, which is so constructed and arranged that in the event it should become necessary to take the valve apart for cleansing or repair, the same may be readily done by persons of relatively little skill.

The nature and characteristic features of the invention will be more readily understood from the following description, taken in connection with the accompanying drawing forming part hereof, in which:

Figure 1 is an elevational view, to a certain extent diagrammatic, illustrating the manner of application of a drain valve of the present invention to an air receiver or other part of compressed air apparatus in which condensate is likely to collect;

Fig. 2 is a longitudinal sectional view of a drain valve embodying the main features of the present invention;

Fig. 3 is a transverse section thereof taken on the line 3—3 of Fig. 2;

Fig. 4 is a transverse section thereof taken on the line 4—4 of Fig. 2; and

Fig. 5 is a transverse section thereof taken on the line 5—5 of Fig. 2.

It should, of course, be understood that the description and drawing herein are illustrative merely, and that various modifications and changes may be made in the structure disclosed without departing from the spirit of the invention.

Referring to the drawing, there is therein shown a preferred embodiment of the invention in which the housing of the valve comprises two parts 10 and 11 threaded to each other, and so shaped that the inner end of the part 11 may be seated against an internal shoulder 12 of the part 10. Adjacent the shoulder 12 the part 10 is provided with an internal annular recess 13 for the reception of a portion of a ring member or bushing 14, one end of which is provided with a valve seat 15 for a purpose to be presently explained.

The part 11 of the housing is provided with an internal valve chamber 16, at the discharge end of which the ring member or bushing 14 is located, and at the other or inlet end of which there is provided a valve seat 17.

The outer end of the part 11 of the housing is threaded as at 18, for the connection, by means of a pipe 19, to the unit to be drained, such as an air receiver 20 (see Fig. 1). Between the threaded inlet portion 18 and the valve chamber 16, there is a port 21 in which the fluted stem 22 of a valve member 23 is slidably mounted.

The valve member 23 is adapted, when in the closed position, to be seated on the valve seat 17 at the inlet end of the valve chamber 16.

The valve member 23 also has an internal sleeve like portion 24, the end of which extends into a cavity 25 in another valve member 26 which is normally seated on the valve seat 15 provided by the ring member or bushing 14. Within the hollow interior of the sleeve like portion 24 of the valve member 23, there is mounted a coil spring 27, one end of which bears against an internal portion of the valve member 23, and the other end of which bears against an internal portion of the valve member 26.

At the place where the sleeve like portion 24 of the valve member 23 extends into the valve member 26, the internal surface of the wall of the valve member 26 is fluted as at 47 to provide guides for the end of the sleeve like portion 24, yet permitting the escape of air or other fluid from the interior of the valve member 26 and the sleeve like portion 24 of the valve member 23, whereby there will be no interference caused by the trapping of said air or fluid therein.

The valve member 23 is also provided adjacent the portion of said valve member which engages the seat 17 at the inlet end of the valve chamber 16 with an annular extension 28, which is of a diameter less than the internal diameter of the valve chamber 16 at that point. This annular extension 28 serves, when the valve member 23 is pushed from its seat to deflect the inflowing condensate and retard the same as it passes into the valve chamber 16. This annular extension also serves, in the event that both the valve members 23 and 26 are simultaneously pushed from their respective seats, to provide a definite retardation of the air flow whereby blowing through of live air from the receiver will be minimized.

The portion 10 of the housing is shaped to provide an internal cylinder 30 into which extends a portion 29 of the valve member 26. The innermost end of the cylinder 30, into which the aforesaid portion 29 of the valve member 26 extends, provides a drainage chamber which, when the valve member 26 is pushed from its seat by the actuation of the piston 32, is in communication with the valve chamber 16. Said drainage chamber is provided near its inner most end with a threaded outlet 31 for the drainage of any condensate or air which may pass into said innermost portion of the cylinder 30, said outlet 31 being threaded for connection thereto of a pipe (not shown) whereby the condensate may be carried away to any convenient place for the discharge of the same.

Mounted within the cylinder 30 is a piston 32 the external diameter of which is slightly less than the internal diameter of the cylinder 30 and said piston is of a peculiar formation in that it is provided, on each face thereof, with a recess 33, the sides 34 of which are of frusto-conical shape whereby there is provided, on each margin, a relatively sharp edge 35 which, in the event of the formation of any ice within the operating end of the cylinder 30, one of the sharp edges 35, provided as aforesaid, will serve to cut the same away as the piston 32 is moved in either direction.

The piston 32 is provided with an annular groove 36, the side faces 37 of which are inclined whereby the same are of frusto-conical shape, and within the groove 36 of the piston there is mounted a packing ring 38 of the type known in the trade as an O-ring.

The cross-sectional diameter of the O-ring 38 is less than the depth of the groove in the piston so that there is provided, when no fluid pressure is acting on the piston 32, a passage way 40 between the piston and the inner surface of the cylinder 30 which will permit the drainage of any condensate which may accumulate in the working end of the cylinder permitting the same to pass the O-ring 38 by reason of its cross-sectional diameter being less than the depth of the groove 36 in the piston 30, and likewise by reason of the side faces 37 of the groove 36 being so spaced as to provide a passageway around the O-ring 38. In this manner the condensate which may accumulate in the cylinder will be permitted to pass the piston when ever the drain valve is in the inert condition.

The outer end of the part 10 of the housing is provided with a connection nipple 41, internally threaded as at 42 for the connection of the operating pipe 43.

The operation of the valve may now be explained. In the normal or inert condition of the device, the parts will be in the positions shown in Fig. 2 of the drawing. The pipe 43 is connected to an operative part (not shown) of the compressed air apparatus, whereby whenever air is permitted to flow to said operative part, an impulse of said air will be communicated to the piston 32 which will cause the O-ring 38 of the piston to impinge against one of the inclined walls 37 of the groove 36 and thereby prevent passage of the actuating air around the sides of the piston.

When the piston is thus actuated by the air impulse, the movement thereof will be communicated to the end portion 29 of the valve member 26 and cause said valve member to be pushed from its seat, thereby permitting any condensate which may have accumulated in the valve chamber 16 to flow through the ring member or bushing 14 provided in the interior between the innermost ends of the valve chamber 16 and the cylinder 30, and then pass through the outlet 31 to be drained away.

In the use of compressed air apparatus, the air which is compressed in the receiver constantly varies in pressure and the controls usually are such that when the air in the receiver falls below a predetermined pressure, the compressor is brought into action, and at which time, when the compressor is started, an impulses will ordinarily occur which may be transmitted through the pipe 43 to the operating end of the cylinder 30. On the other hand, the compressor will continue to operate until the pressure within the container reaches a predetermined maximum, whereupon further operation of the compressor is stopped. However, in some arrangements the actuating impulse will be obtained in other ways and at other times.

The coil spring 27 within the sleeve like portion 24 of the valve member 23 is so calibrated as to permit the valve member 23 to be pushed from its seat whenever the pressure in the receiver reaches a predetermined amount, preferably slightly below the maximum at which the compressor is stopped.

When the valve member 23 is thus pushed from its seat any condensate which has accumulated in the bottom of the receiver, or in the pipe line 19 which extends into the inlet end of the valve chamber 16, will be permitted to flow into the valve chamber 16 and will remain therein until the valve member 26 is pushed from its seat by an air impulse acting on the piston 32.

It will be noted that by the foregoing arrangement ordinarily in the inert condition of the device, both valve members 23 and 26 will be impelled to their respective seats by the spring 27, and the valve 23 will only be pushed from its seat to permit the condensate to flow into the valve chamber 16 at such times as the pressure in the receiver reaches a predetermined high point, and that the same will be held on its seat by the spring 27 whenever the pressure in the receiver falls below a certain predetermined amount.

It will also be noted that the valve member 26 will only be pushed from its seat when an impulse is imparted to the piston 32 which serves to operate said valve member 26, hence the danger of blowing off of the air within the receiver by reason of sticking of a valve member, or by reason of scale or other foreign materials becoming lodged on one of the valve seats, will be effectively obviated.

Furthermore, the piston 32 is so constructed and arranged that any condensate which may pass into the operating end of the cylinder will, when the device is in the inert condition, be permitted to trickle through the passageway around the piston and its O-ring as hereinbefore described.

However, in the event that any of such condensate should freeze in the cylinder, the sharp edges provided by the piston constructed as aforesaid will cut the same away without interfering with the action of the piston.

It should also be noted that when the valve members 23 and 26 are each in the closed position, there is a space between thte end of the sleeve like extension 24 of the valve member 23 and the inner end of the cavity 25 in the valve member 26. This space is of such extent only that in the event of an abnormal movement of the piston 32, by reason of the continued application of pressure thereto or otherwise, the valve member 23 will be forced to its seat and will be held on said seat notwithstanding an increase in pressure in the receiver which would normally cause the valve member 23 to be pushed from its seat. In this manner the pressure within the receiver will be maintained even under certain abnormal conditions which sometimes occur, and which ordinarily cause a complete loss of pressure in the receiver.

I claim:

1. A drain valve for condensate comprising a housing made of separable parts, a condensate inlet connection at one end of said housing, a bushing fixedly mounted within said housing subdividing the interior thereof into a valve chamber extending interiorly to said one end of said housing and an operating chamber extending interiorly to the other end of said housing, said housing at said one end having a first valve seat in said valve chamber facing towards said bushing, said bushing having in said valve chamber a valve seat facing toward said first valve seat, an actuating pressure fluid inlet connection at the opposite end of said housing and in communication with said operating chamber, a piston mounted in said operating chamber between said bushing and said actuating pressure fluid connection, said housing having a drain connection from said operating chamber, a first valve member slidably supported in said bushing and having a portion movable in said valve chamber seating on the valve seat on said bushing and shutting off communication between said valve chamber and said drain connection, said first member having another portion in said operating chamber and in engagement with said piston, a second valve member in said valve chamber for engagement with the first valve seat and cutting off communication between said inlet connection and said valve chamber, a resilient member interposed between said valve members to impel the same toward their respective seats, said first valve member having a portion in sliding engagement with said second valve member, said piston moving said first valve member to open position for the discharge of fluid from the valve chamber through said operating chamber to said drain connection.

2. A drain valve as defined in claim 1 in which one of said valve members has a portion thereon for engagement with a portion of the other valve member for limiting the movement of said valve members towards each other.

3. A drain valve as defined in claim 1 in which said housing has a bore extending longitudinally axially outwardly from said valve chamber and said second valve member has a portion slidable in said bore.

References Cited in the file of this patent

UNITED STATES PATENTS

| | | |
|---|---|---|
| 2,173,819 | Boldt | Sept. 26, 1939 |
| 2,310,917 | Daly | Feb. 16, 1943 |
| 2,388,422 | Krastel | Nov. 6, 1945 |
| 2,509,879 | Pelton | May 30, 1950 |
| 2,627,869 | Whalen | Feb. 10, 1953 |
| 2,732,854 | George | Jan. 31, 1956 |